(12) United States Patent  
Touret

(10) Patent No.: US 9,173,177 B2  
(45) Date of Patent: Oct. 27, 2015

(54) SATELLITE TRANSMISSION SYSTEM

(71) Applicant: THALES, Neuilly-sur-Seine (FR)

(72) Inventor: Marc Touret, Colombes (FR)

(73) Assignee: Thales, Courbevoie (FR)

( * ) Notice: Subject to any disclaimer, the term of this patent is extended or adjusted under 35 U.S.C. 154(b) by 96 days.

(21) Appl. No.: 13/716,183

(22) Filed: Dec. 16, 2012

(65) Prior Publication Data

US 2013/0155944 A1    Jun. 20, 2013

(30) Foreign Application Priority Data

Dec. 16, 2011 (FR) ...................................... 11 03885

(51) Int. Cl.
| | |
|---|---|
| *H04W 52/34* | (2009.01) |
| *H04W 52/24* | (2009.01) |
| *H04B 7/185* | (2006.01) |
| *H04W 24/02* | (2009.01) |

(52) U.S. Cl.
CPC ........... *H04W 52/34* (2013.01); *H04B 7/18515* (2013.01); *H04W 52/243* (2013.01); *H04W 24/02* (2013.01)

(58) Field of Classification Search
CPC .............. H04W 24/02; H04B 7/18539; H04B 7/18517; H04L 1/0015; H04L 1/0002; H04L 1/0003; H04L 1/0009; H04L 12/6418; H04L 61/1529; H04M 11/062; H04M 7/006
USPC ......................................... 370/493–495, 527
See application file for complete search history.

(56) References Cited

U.S. PATENT DOCUMENTS

| | | | |
|---|---|---|---|
| 4,837,786 A | | 6/1989 | Gurantz et al. |
| 6,154,484 A | * | 11/2000 | Lee et al. ...................... 375/130 |
| 7,043,199 B2 | | 5/2006 | Dai et al. |
| 7,826,440 B1 | * | 11/2010 | Suder et al. ................... 370/352 |
| 2003/0054816 A1 | | 3/2003 | Krebs et al. |
| 2004/0127158 A1 | | 7/2004 | Dai et al. |
| 2004/0131028 A1 | | 7/2004 | Schiff et al. |
| 2011/0249706 A1 | | 10/2011 | Beeler et al. |

FOREIGN PATENT DOCUMENTS

WO    2004/029794 A1    4/2004

OTHER PUBLICATIONS

Jocic, L. B. et al., "Adapting Commercial Satellites to Military Communication Needs", DOI: 10.1109/ AERO.1996.496078.
Written Opinion issued in SG Application No. 201209338-1 issued Oct. 4, 2013.

* cited by examiner

*Primary Examiner* — Min Jung
(74) *Attorney, Agent, or Firm* — Baker & Hostetler LLP

(57) ABSTRACT

A satellite transmission system comprises at least: one satellite and two stations comprising transmission means transmitting simultaneously and in the same frequency band a first, high-bit-rate signal and a second, low-bit-rate signal, the second signal allowing changing of frequency of the carrier signal. The station(s) include reception means for receiving simultaneously and in the same frequency band the first and second signal. The system includes means for detecting interference on the frequency band. The transmission means and reception means respectively switch the transmission and reception of the second signal from a low bit rate to a medium bit rate and deactivate the transmission of the first signal in presence of interference, and the transmission means and reception means respectively switch the transmission and reception of the second signal from a medium bit rate to a low bit rate and activate transmission of the first signal in absence of interference.

3 Claims, 2 Drawing Sheets

SATELLITE TRANSMISSION SYSTEM

CROSS-REFERENCE TO RELATED APPLICATION

This application claims priority to foreign French patent application No. FR 1103885, filed on Dec. 16, 2011, the disclosure of which is incorporated by reference in its entirety.

FIELD OF THE INVENTION

The present invention relates to a satellite transmission system comprising at least two stations and one satellite. Each station comprises at least one transmitter and one receiver of satellite signals. This system is designed to operate in an environment comprising sources of interference and in which the use of the frequency bands is costly. These stations may for example be earth stations, transported in a land vehicle, a ship or an aircraft.

BACKGROUND

Also known, in order to carry out the transmission of satellite signals in the presence of sources of interference, are systems such as those shown in FIG. 1 using two signals of different types. A first, high-bit-rate signal that is not protected against interference, and a second, low-bit-rate signal that is however protected against interference. This protection against interference may be achieved, for example, by implementing a system regularly changing the frequency of the carrier signal. It is known practice to implement these two signals in two disconnected bands and, when the first, high-bit-rate signal suffers interference, to deactivate the latter and to use the whole of the band for the transmission of the second, low-bit-rate signal. This solution has the drawback of not being optimal. Specifically, the portion of the frequency band used for the transmission of the second, low-bit-rate signal does not make it possible, when there is no interference, to transmit a bit rate equivalent to that which would be available if this portion of the band were used for the transmission of the first, high-bit-rate signal. This solution also has the drawback of causing a break in the continuity of service during the transition from one configuration to another. This break in transmission may be as long as several minutes.

Also known are systems as shown in American patent application US 2011/0249706. These systems consist of stations 101 and a satellite 102. This satellite is used to relay the signals transmitted from one station to the other station. Each station comprises a transmitter 103 and a receiver 104. The transmitters and receivers included in the stations are used to transmit and to receive a first, high-bit-rate signal and a second, low-bit-rate signal that is protected against interference simultaneously and by using the same frequency band. In these systems, the first, high-bit-rate signal can for example follow the recommendations of the standard DVB-S2 (ETSI 302 307). Amongst other things, this standard allows the transmission of a 20 Mbps signal in a 20 MHz bandwidth. For the second, low-bit-rate signal it is possible to use, for example, a signal with a transmission rate of 20 kbit/s using a bandwidth of 2 MHz, this signal being able also to have a device allowing the carrier frequency to move throughout the whole 20 Mhz band used by the first, high-bit-rate signal. The ratio between the spread of the first, high-bit-rate signal and of the second, low-bit-rate signal is in this case 1000, namely a power differential of 30 dB between the first and the second signal. The second, high-bit-rate signal is therefore not disrupted by the first, low-bit-rate signal and thus the second, low-bit-rate signal can cohabit simultaneously in the same frequency band with the first, high-bit-rate signal without causing deteriorations. However, since the configuration of the two signals is fixed, the presence of an interference element renders the first, high-bit-rate signal ineffective, without the resources that are allocated thereto (in particular the power used by the first, high-bit-rate signal) being able to reallocated to the second, low-bit-rate signal. The lack of adaptability to the environmental conditions of this type of system therefore does not make it possible to achieve optimal performance.

SUMMARY OF THE INVENTION

The object of the present invention is therefore to remedy these problems by proposing a satellite transmission system improving the use of the frequency band and not causing breaks in the continuity of service during a change in the external conditions of use of the said system.

According to one aspect of the invention, a satellite transmission system is thus proposed comprising at least one satellite and at least two stations. The station comprises transmission means adapted for transmitting simultaneously and in the same frequency band a first, high-bit-rate signal and a second, low-bit-rate signal, the second signal being adapted to allow the changing of the frequency of the carrier signal during the transmission. The frequency of the carrier signal of the second signal moves throughout the whole frequency bandwidth used by the first signal. The station also comprises reception means adapted for receiving simultaneously and in the same frequency band the said first and the said second signal. The system also comprises means for detecting the presence of interference on the said frequency band. Moreover the transmission means and reception means are respectively adapted for switching the transmission and the reception of the said second signal from a low bit rate to a medium bit rate and for deactivating the transmission of the said first signal in the presence of interference. The transmission means and reception means are also respectively adapted for switching the transmission and the reception of the said second signal from a medium bit rate to a low bit rate and for activating the transmission of the said first signal in the absence of interference.

A low bit rate is considered to be a bit rate of less than 20 kbps, a medium bit rate is considered to be a bit rate of between 20 kbps and 8 Mbps and a high bit rate is considered to be a bit rate of more than 8 Mbps.

This system therefore provides the double advantage of allowing the first, high-bit-rate signal to use the whole of the frequency band available while maintaining at all times a second, low-bit-rate signal making it possible to continue the data transmission even when there is interference. Since the two signals are activated at all times, there is no risk of breaks in the continuity of service when the disruptions occur. Moreover, in the event of interference, the system makes it possible to deactivate the first, high-bit-rate signal that has become useless and to return to the initial state when the system detects the end of the interference. The efficiency of the system lies in its capacity to detect interference which introduces errors into the transmitted data stream, to detect the end of the interference, to change the waveform and to redirect the data stream to the waveform providing greater transmission capacity, and to do this synchronously between the transmitter and the receiver.

This system allows the transmission and the reception of the first, high-bit-rate signal with a power such that the power of its carrier is above or close to the ambient thermal noise level. The first, high-bit-rate signal is transmitted without using spread spectrum techniques of the Direct Sequence Spread Spectrum (also known under the acronym DSSS) type of spreading in the prior art, while the second, low-bit-rate signal uses a spread spectrum technique. The object is to have the second, low-bit-rate signal of which the transmission power is markedly below the noise level (<−10 dB) while the first, high-bit-rate signal is transmitted at a power higher than or close the noise level (Es/N0>0 dB).

On reception, the second, low-bit-rate signal is assimilated by the receiver as a noise relative to the first, high-bit-rate signal. Moreover, the despreading techniques known to those skilled in the art allow the receiver to receive and determine the information contained in the second, low-bit-rate signal.

According to one feature of the invention, the transmission means and reception means are adapted for maintaining the transmission between the transmitter and the receiver during the switching of the said first signal and of the said second signal.

Therefore, the data stream (up to the capabilities of the medium-bit-rate signal) is transmitted without interruption of service (for example a data interchange using a voice protocol over internet protocol will not be interrupted during the switch).

According to one feature of the invention, the system comprises at least two stations which are not contained in one and the same satellite spot.

Thus, the implementation of the invention is independent of the geographic position of the stations and of the configuration of the satellite.

According to one feature of the invention, the satellite transmission method comprises:
  a step of detecting interference (201),
  a step of switching transmission means (103) and reception means (104) in order to deactivate the transmission of a first, high-bit-rate signal and to enable the transmission and the reception of a second, low-bit-rate signal to a medium bit rate in the presence of interference,
  a step of switching the said transmission means (103) and the said reception means (104) in order to activate the transmission of the said first, high-bit-rate signal and to enable the transmission and the reception of the said second signal from a medium bit rate to a low bit rate in the absence of interference.

Thus this method provides the following advantages:
  The transmission of a data stream (up to the transmission capacities of the medium-bit-rate signal) does not depend on the propagation conditions and in particular whether or not an interfering signal is present.
  The planning of the satellite resources is simplified since it is not necessary to reserve one frequency resource for the protected waveform and another frequency resource for the unprotected waveform. Only one frequency resource must be planned.

BRIEF DESCRIPTION OF THE DRAWINGS

The invention will be better understood and other advantages will become evident on reading the detailed description made as a non-limiting example and with the aid of the figures amongst which.

DETAILED DESCRIPTION

Figure 1:
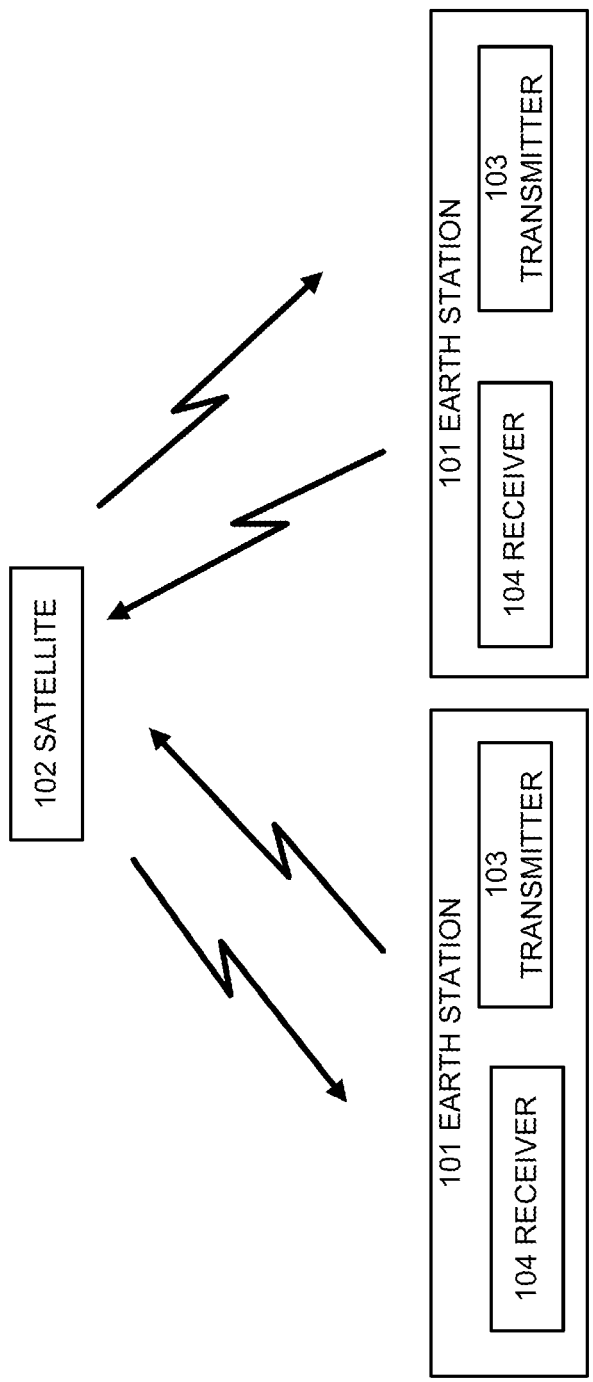
FIG. 1 shows a system according to the closest prior art.

The system as shown in FIG. 1 represents the closest prior art and consists of stations 101 and a satellite 102. This satellite is used to repeat the signals transmitted from one station to the other station. Each station comprises a transmitter 103 and a receiver 104. The transmitters and receivers included in the stations are used to transmit and to receive simultaneously a first, high-bit-rate signal and a second, low-bit-rate signal by using the same frequency band.

The first, high-bit-rate signal for example can follow the recommendations of the standard DVB-S2 (ETSI 302 307). This standard allows the transmission of a 20 Mbps signal in a 20 MHz bandwidth. For the second, low-bit-rate signal, it is possible to use, for example, a signal with a transmission bit rate of 20 kbit/s using a bandwidth of 2 MHz, this signal allowing the carrier frequency to move throughout the whole of the 20 Mhz band used by the first, high-bit-rate signal. The frequency hopping mechanisms can be used in relation with the spread spectrum (FHSS) with code division multiple access (FH-CDMA) or using multiple access managed by different carrier frequency hops for each user (OFHMA). The ratio between the spreading of the first, high-bit-rate signal and of the second, low-bit-rate signal is in this case 1000. Taking account of the spread, the power difference is therefore 30 dB between the first and the second signal. The second, high-bit-rate signal is therefore not disrupted by the first, low-bit-rate signal and hence the second, low-bit-rate signal can cohabit simultaneously in the same frequency band with the first, high-bit-rate signal without damaging the performance of the first, high-bit-rate signal. However, since the configuration of the two signals is fixed, the presence of an interfering element renders the first, high-bit-rate signal ineffective without its resources (in particular the power used by the first, high-bit-rate signal) being able to be reallocated to the second, low-bit-rate signal. The lack of adaptability to the environmental conditions of this type of system does not allow it to achieve adequate performance.

Figure 2:
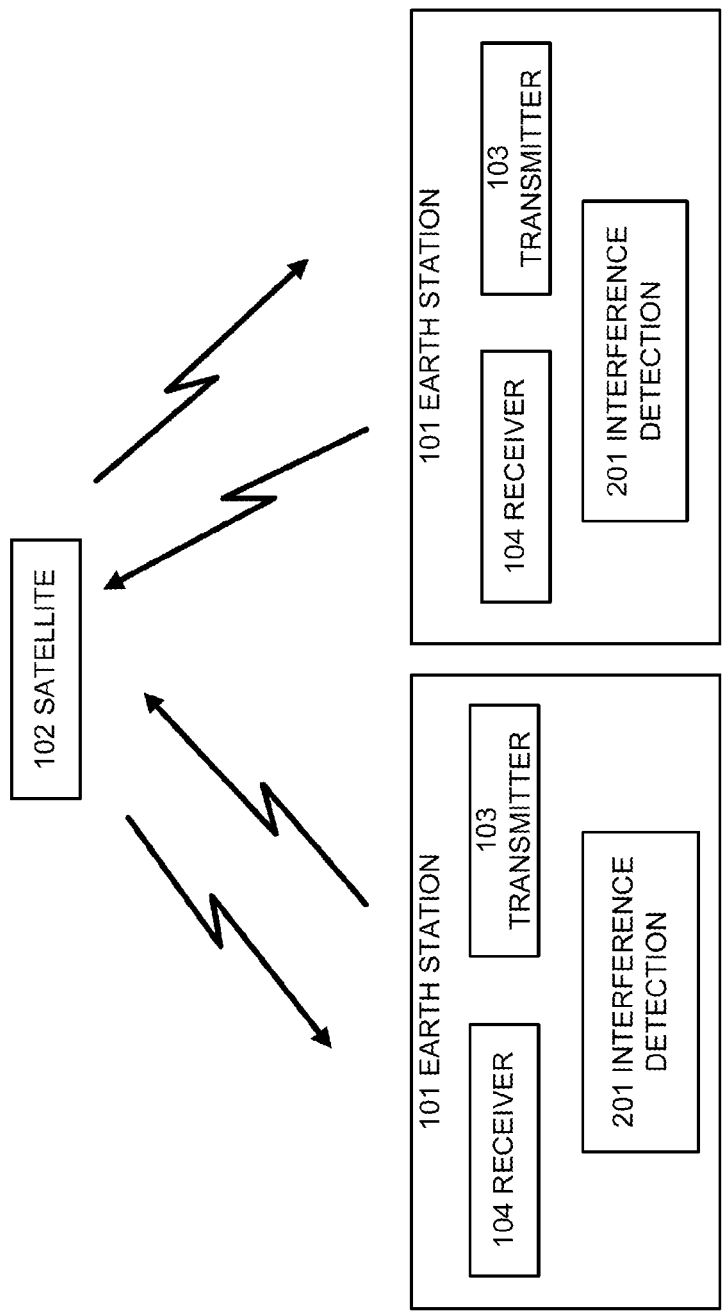
FIG. 2 shows a first embodiment of the system according to one aspect of the invention.

The system as shown in FIG. 2 consists of the elements from the closest prior art as shown in FIG. 1. Moreover, the system comprises an interference detection device 201. This interference detection can be carried out by computing the signal-to-noise ratio or by spectral analysis with reconstruction of the received signal.

When interference is detected, the transmission and reception of the first, high-bit-rate signal is deactivated and the transmission and reception of the second, low-bit-rate signal changes settings. This change of settings is used to increase the power allocated to the second, low-bit-rate signal and to increase its bit rate in order to obtain a medium-bit-rate signal. The device for changing settings of the system therefore switches the system between the following two states:
  State with no interference, the system sends the first, high-bit-rate signal and the second, low-bit-rate signal in the same frequency band. The first, high-bit-rate signal transmits most of the traffic while the second, low-bit-rate signal is extremely spread in order to transmit only the data necessary for maintaining the second, low-bit-rate signal without disrupting the first, high-bit-rate signal.
  In the state with interference, the system deactivates the transmission of the first, high-bit-rate signal and transmits the traffic by using the second, low-bit-rate signal. This second signal is reconfigured in order to increase its spectral efficiency and to use the power previous allocated to the first signal. The change of spectral efficiency is carried out by changing the coding parameters, spread factor and modulation. The second signal will then have a medium bit rate. This makes it possible to have a second signal that is resistant to interference while providing a higher bit rate.

This change between the two states, without interference and with interference, is carried out automatically without a break in the communications transmitted between the various stations. The traffic flow is directed to the appropriate signal: first, high-bit-rate signal in the interference-free state and, second, low-bit-rate signal in the state with interference. The data transmitted by the two signals are usually IP streams. An IP router can therefore be connected to each of the streams. Depending on the state of the system (without interference or with interference) the data are directed by the router to the appropriate signal. Routing protocols of the OSPF type are then used to correctly direct the traffic flow from end to end.

The invention claimed is:

1. A satellite transmission system comprising at least one satellite and at least two stations communicating through said satellite, the stations comprising a transmitter configured to transmit in a same frequency band, a first high-bit-rate signal at a first power level and a second low-bit-rate signal at a second power level, the second signal using spreading techniques and a narrower or equal frequency band than the first signal, the stations also comprising a receiver configured to receive simultaneously and in the same frequency band the first and the second signal, the system further comprising:
  a detection device configured to identify a presence of interference on the frequency band,
  the transmitter and receiver being respectively adapted for switching the transmission and the reception of the second signal from a low bit rate to a medium bit rate and for deactivating the transmission of the first signal in the presence of interference, wherein the second signal is transmitted at a power level equal to the sum of the first and the second power levels, and
  the transmitter and receiver being respectively adapted for switching the transmission and the reception of the second signal from a medium bit rate to a low bit rate and for activating the transmission of the first signal in the absence of interference,
  wherein the first signal is transmitted at a power level equal to the first power level and the second signal is transmitted at a power level equal to the second power level.

2. The system according to claim 1, in which the transmitters and receivers are adapted for maintaining the transmission between the transmitter and the receiver during the switching of the first and of the second signal by transmitting a traffic flow on the high-bit rate and low-bit rate signals in absence of interference and on the medium bit rate signal in a presence of interference.

3. A satellite transmission method comprising:
  detecting an interference in a frequency band of a satellite transmission,
  deactivating, when an interference is detected, for transmitters and receivers, the transmission of a first, high-bit-rate signal transmitted at a first power level and switching a second, low-bit-rate signal transmitted at a second power level to a medium bit rate signal, wherein the second signal is transmitted at a power level equal to the sum of the first and the second power levels, and directing a traffic flow from a transmission on the high bit rate signal to a transmission on the medium bit rate signal, and
  activating, when no interferences are detected, for transmitters and receivers, the transmission of the first, high-bit-rate signal and switching the second signal from a medium bit rate to a low bit rate, wherein the first signal is transmitted at a power level equal to the first power level and the second signal is transmitted at a power level equal to the second power level, and directing the traffic flow from a transmission on the medium bit rate signal to a transmission on the high bit rate signal.

* * * * *